(12) United States Patent
Ohashi

(10) Patent No.: US 8,472,054 B2
(45) Date of Patent: Jun. 25, 2013

(54) INFORMATION DISTRIBUTION APPARATUS, INFORMATION DISTRIBUTION METHOD, AND COMPUTER PROGRAM FOR DISTRIBUTING A SETTING VALUE OF A PROGRAM BASED ON A CONDITION

(75) Inventor: Toshio Ohashi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 12/693,964

(22) Filed: Jan. 26, 2010

(65) Prior Publication Data

US 2010/0188676 A1 Jul. 29, 2010

(30) Foreign Application Priority Data

Jan. 28, 2009 (JP) ................................. 2009-017095
Nov. 6, 2009 (JP) ................................. 2009-255139

(51) Int. Cl.
*G06F 3/12* (2006.01)
*G06F 9/44* (2006.01)
*G06K 15/02* (2006.01)
*H04L 29/08* (2006.01)

(52) U.S. Cl.
USPC ........... 358/1.15; 358/1.9; 709/203; 709/223; 719/321; 719/327

(58) Field of Classification Search
None
See application file for complete search history.

(56) References Cited

U.S. PATENT DOCUMENTS

| 6,335,795 | B1 | 1/2002 | Neuhard |
| 8,259,315 | B2 * | 9/2012 | Ebuchi ......................... 358/1.13 |
| 2002/0138597 | A1 * | 9/2002 | Hashimoto et al. ........... 709/220 |
| 2004/0098471 | A1 * | 5/2004 | Shima ........................... 709/221 |
| 2006/0023254 | A1 | 2/2006 | Hikichi |

FOREIGN PATENT DOCUMENTS

| JP | 2006-040061 A | 2/2006 |
| JP | 2008-158753 A | 7/2008 |

* cited by examiner

*Primary Examiner* — Barbara Reinier
(74) *Attorney, Agent, or Firm* — Canon U.S.A., Inc. IP Division

(57) ABSTRACT

A method for distributing information includes acquiring information indicating a condition for a setting value to be set to a program from an image forming apparatus, verifying whether the setting value satisfies a range of the setting value based on the acquired information, and distributing, if the setting value satisfies the condition, the setting value to the image forming apparatus.

9 Claims, 16 Drawing Sheets

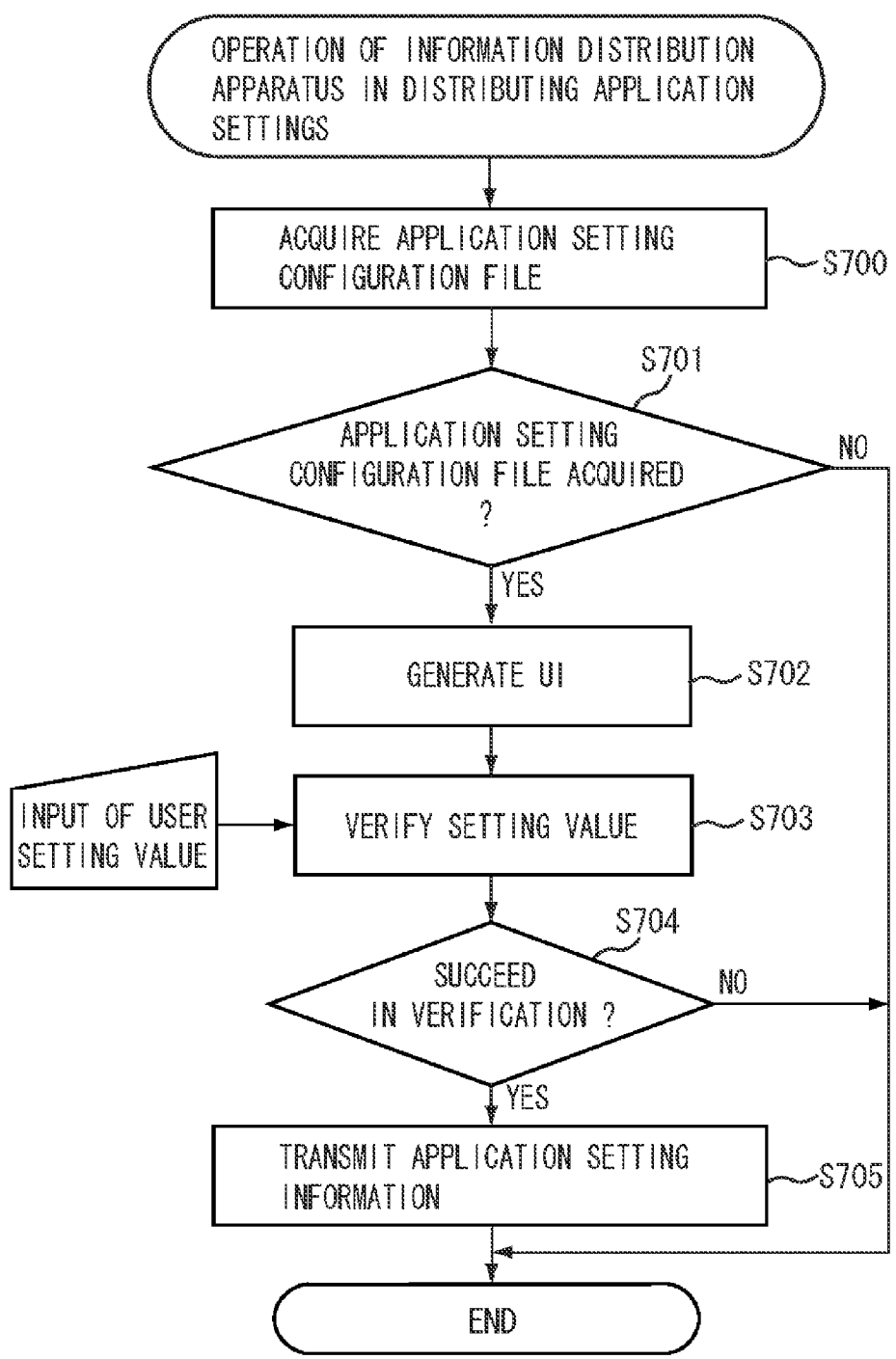

FIG. 8

```
<xsd:element name="MaxTotalLogSize" type="TypeLogSize"/>

<xsd:element name="WebServiceUrl" type="TypeWebServiceUrl"/>

<xsd:element name="MailAddresses" type="TypeMailAddress"
minOccurs="0" maxOccurs=""10 />

<xsd:simpleType name="TypeLogSize">                    ~801
  <xsd:restriction base="xsd:integer">
    <xsd:minExclusive value="0">
    <xsd:maxExclusive value="200">
  </xsd:restriction>
</xsd:simpleType>

<xsd:simpleType name="TypeWebServiceUrl">              ~802
  <xsd:restriction base="xsd:string">
    <xsd:enumeration value="http://localhost/webservice1">
    <xsd:enumeration value="http://localhost/webservice2">
    <xsd:enumeration value="http://localhost/webservice3">
  </xsd:restriction>
</xsd:simpleType>

<xsd:simpleType name="TypeMailAddress">                ~803
  <xsd:restriction base="xsd:string">
    <xsd:maxLength value="256">
  </xsd:restriction>
</xsd:simpleType>
```

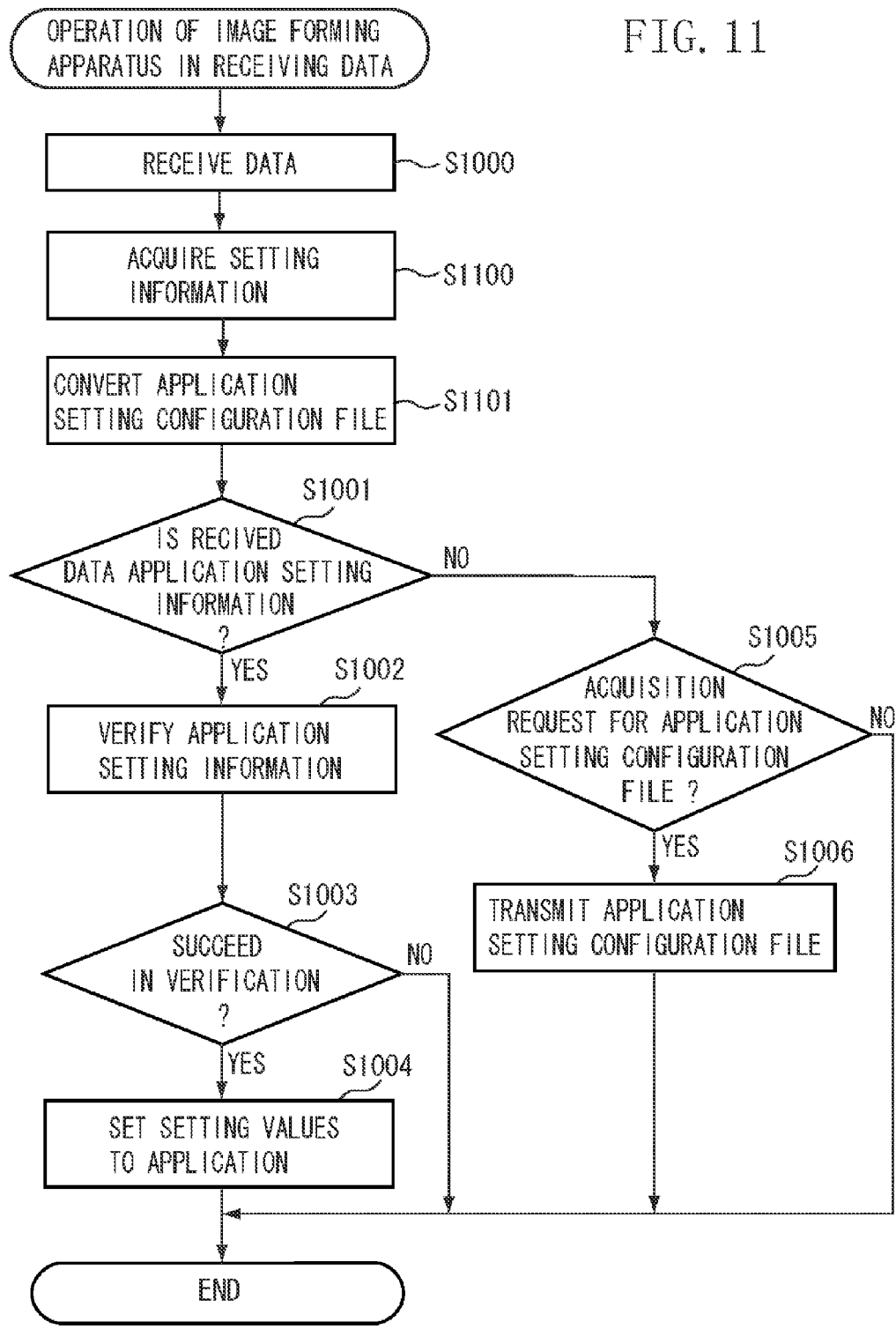

FIG. 12

```
<xsd:element name="MaxTotalLogSize" type="TypeLogSize"/>
<xsd:element name="MailAddresses" type="TypeMailAddress" minOccurs="0" maxOccurs=""10 />
<xsd:element name="WebServiceUrl" type="TypeWebServiceUrl"/>

<xsd:simpleType name="TypeLogSize">
  <xsd:restriction base="xsd:integer">
    <xsd:minExclusive value="0">
    <xsd:maxExclusive value="80">
  </xsd:restriction>
</xsd:simpleType>

<xsd:simpleType name="TypeWebServiceUrl">
  <xsd:restriction base="xsd:string">
    <xsd:enumeration value="http://172.24.17.1/webservice1">
    <xsd:enumeration value="http://172.24.17.1/webservice2">
    <xsd:enumeration value="http://172.24.17.1/webservice3">
  </xsd:restriction>
</xsd:simpleType>

<xsd:simpleType name="TypeMailAddress">
  <xsd:restriction base="xsd:string">
    <xsd:maxLength value="256">
  </xsd:restriction>
</xsd:simpleType>
```

FIG. 13

```
<xsd:element name="MaxTotalLogSize" type="TypeLogSize"/>
<xsd:element name="MailAddresses" type="TypeMailAddress" minOccurs="0" maxOccurs="" 10 />
<xsd:element name="WebServiceUrl" type="TypeWebServiceUrl"/>
<xsd:element name="LogUploadInterval" type="TypeLogUploadInterval">

<xsd:simpleType name="TypeLogSize">
  <xsd:restriction base="xsd:integer">
    <xsd:minExclusive value="0">
    <xsd:maxExclusive value="80">
  </xsd:restriction>
</xsd:simpleType>

<xsd:simpleType name="TypeWebServiceUrl">
  <xsd:restriction base="xsd:string">
    <xsd:enumeration value="http://172.24.17.1/webservice1">
    <xsd:enumeration value="http://172.24.17.1/webservice2">
    <xsd:enumeration value="http://172.24.17.1/webservice3">
  </xsd:restriction>
</xsd:simpleType>

<xsd:simpleType name="TypeLogUploadInterval">
  <xsd:restriction base="xsd:string">
    <xsd:enumeration value="month">
    <xsd:enumeration value="week">
    <xsd:enumeration value="day">
    <xsd:enumeration value="hour">
  </xsd:restriction>
</xsd:simpleType>

<xsd:simpleType name="TypeMailAddress">
  <xsd:restriction base="xsd:string">
    <xsd:maxLength value="256">
  </xsd:restriction>
</xsd:simpleType>
```

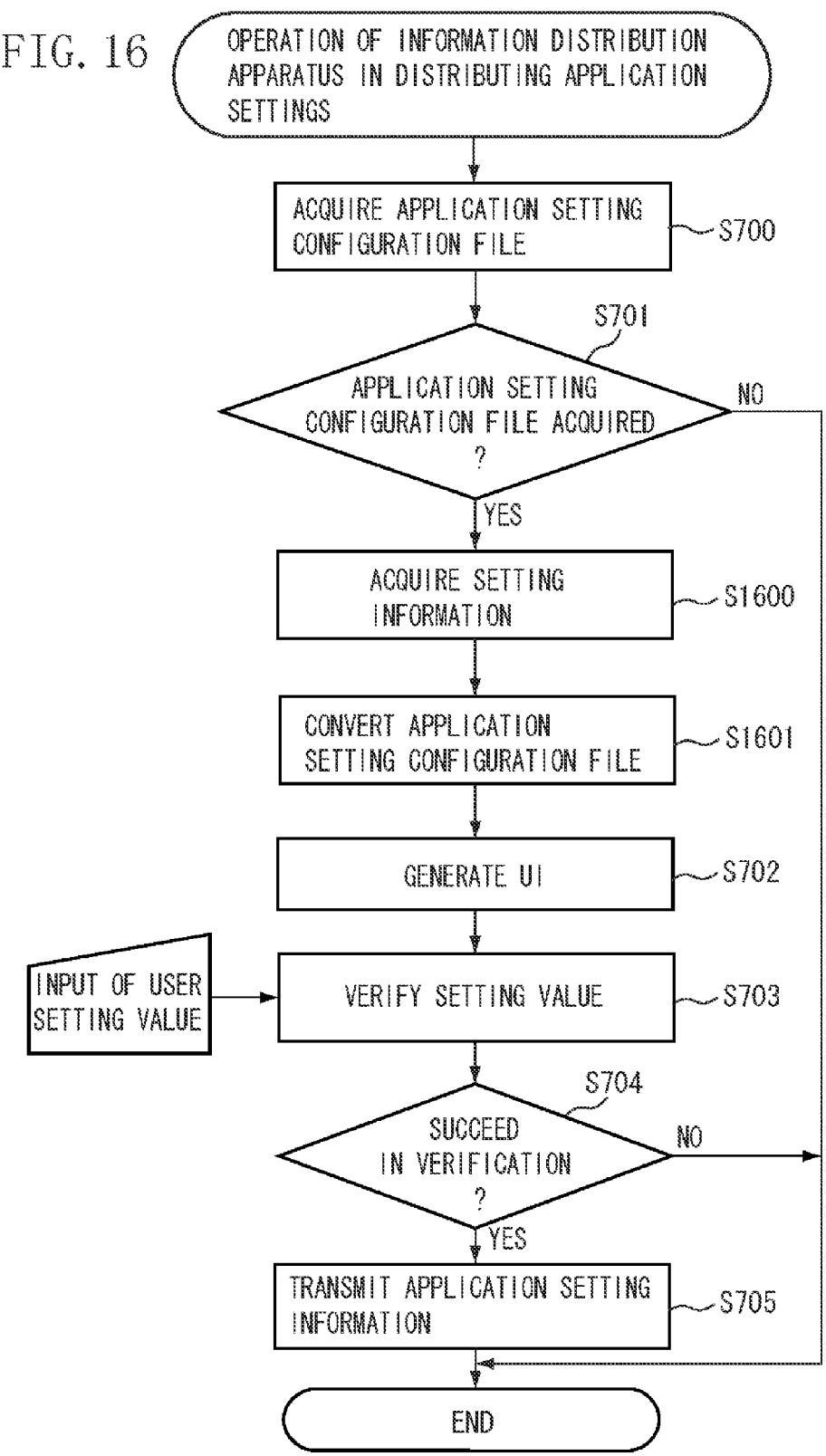

INFORMATION DISTRIBUTION APPARATUS, INFORMATION DISTRIBUTION METHOD, AND COMPUTER PROGRAM FOR DISTRIBUTING A SETTING VALUE OF A PROGRAM BASED ON A CONDITION

BACKGROUND OF THE INVENTION

1. Field of the Invention

The present invention relates to an information distribution apparatus, an information distribution method, and a computer program therefor.

2. Description of the Related Art

Japanese Patent Application Laid-Open No. 2006-40061 discusses a conventional method for distributing program setting data from an information distribution apparatus to an information processing apparatus. More specifically, in the method discussed in Japanese Patent Application Laid-Open No. 2006-40061, the information processing apparatus updates a setting set thereto based on "data described in the format of a structured document, such as extended markup language (XML)", which is received from the information distribution apparatus.

When data of a variable format is transmitted from an information processing apparatus to an information distribution apparatus, providing and executing a function for verifying whether the data to be transmitted and received has an appropriate format are to be performed.

Japanese Patent Application Laid-Open No. 2008-158753 discusses a method for verifying the format of data to be transmitted and received. In the method discussed in Japanese Patent Application Laid-Open No. 2008-158753, metadata type information is embedded in document data and the document data is transmitted together with the document data. Thus, in the method discussed in Japanese Patent Application Laid-Open No. 2008-158753, an apparatus that receives the document data and the metadata type information verifies whether the metadata and the type data is consistent with each other based on the metadata type information embedded in the document data.

SUMMARY OF THE INVENTION

According to an aspect of the present invention, an information distribution apparatus configured to distribute a setting value of a program installed on an image forming apparatus to the image forming apparatus. The information distribution apparatus includes an acquisition unit configured to acquire information indicating a condition for an applicable setting value to be set to the program, a verification unit configured to verify whether the setting value satisfies a range of the applicable setting value to be set to the program based on the acquired information, and a distribution unit configured, if the setting value satisfies the condition, to distribute the setting value to the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 7 is a flow chart illustrating an example of an operation executed by the information distribution apparatus when application setting information is distributed according to the first exemplary embodiment of the present invention.

FIG. 8 illustrates an example of an application setting configuration file defined as an XML schema according to the first exemplary embodiment of the present invention.

FIG. 11 is a flow chart illustrating an example of an operation executed by the information processing apparatus when data distributed from the information distribution apparatus is received according to a second exemplary embodiment of the present invention.

FIG. 12 illustrates an example of an application setting configuration file, which is obtained by converting, according to the setting of the information processing apparatus, the application setting configuration file illustrated in FIG. 8 according to the second exemplary embodiment of the present invention.

FIG. 13 illustrates an example of an application setting configuration file, which is obtained by adding a definition of an item, such as "every hour" "every day", "every week", or "every month", as a value for setting an upload interval of a log file to the application setting configuration file illustrated in FIG. 8 according to the second exemplary embodiment.

FIG. 16 is a flow chart illustrating an example of an operation executed by the information distribution apparatus when application setting information is distributed according to the third exemplary embodiment of the present invention.

DESCRIPTION OF THE EMBODIMENTS

Various exemplary embodiments, features, and aspects of the invention will be described in detail below with reference to the drawings.

Figure 1:
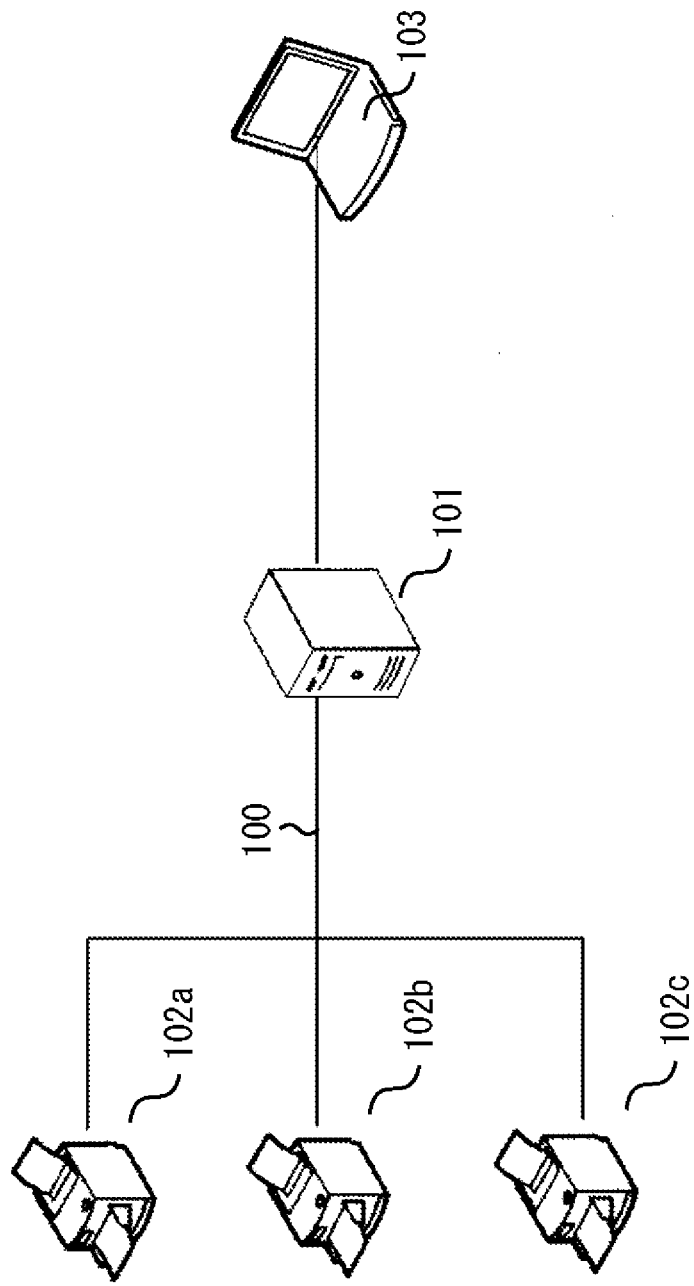
FIG. 1 illustrates an exemplary configuration of the entire application distribution system according to a first exemplary embodiment of the present invention.

FIG. 1 illustrates an exemplary configuration of the entire application distribution system according to a first exemplary embodiment of the present invention. Referring to FIG. 1, the application distribution system includes an information distribution apparatus 101, an information processing apparatus 102, and a client apparatus 103, which can communicate with one another via a network 100.

Each of the information distribution apparatus 101 and the client apparatus 103 has a configuration similar to that of a general-purpose computer. The information processing apparatus 102 is connected to the network 100. Any apparatus that can be managed from the information distribution apparatus 101 can be used as the information processing apparatus 102.

In the present exemplary embodiment, it is supposed that a multifunction peripheral (MFP) is used as the information processing apparatus 102. An apparatus other than an MFP, such as a printer or a facsimile transmission apparatus, can be used as the information processing apparatus 102. The information processing apparatus 102 also functions as an image forming apparatus.

In the present exemplary embodiment, a configuration and a flow of processing for distributing application setting information from the information distribution apparatus 101 to the information processing apparatus 102 will be described in detail.

Now, an exemplary hardware and software configuration of the information distribution apparatus 101, the information processing apparatus 102, and the client apparatus 103 will be respectively described in detail. The client apparatus 103 has a configuration similar to that of a general-purpose computer, similarly to the hardware configuration of the information distribution apparatus 101. Accordingly, with respect to the client apparatus 103, the software configuration thereof only will be described in detail.

Figure 2:
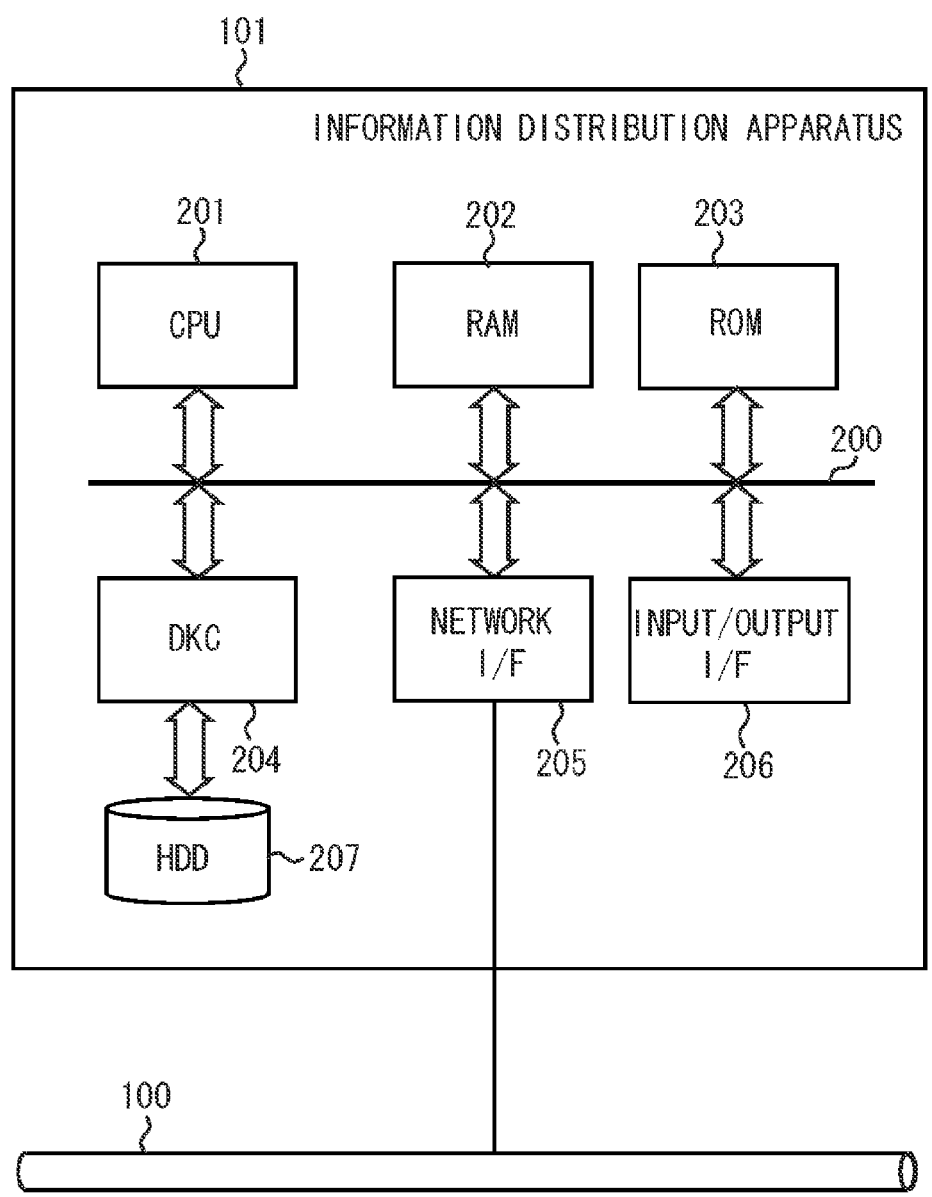
FIG. 2 illustrates an exemplary hardware configuration of an information distribution apparatus according to the first exemplary embodiment of the present invention.

FIG. 2 illustrates an exemplary hardware configuration of the information distribution apparatus 101.

Referring to FIG. 2, a system bus 200 connects units and components of the information distribution apparatus 101 with one another. A central processing unit (CPU) 201 controls the entire information distribution apparatus 101 and executes calculation. A random access memory (RAM) 202 functions as a work area and a temporary storage area, on which various programs and data for various processing are loaded and executed.

A read-only memory (ROM) 203 is a storage area for storing a program, such as a system boot program. A disk controller (DKC) 204 controls an external storage device, such as a hard disk drive (HDD) 207. The HDD 207 stores a program and data, which may be loaded and executed on the RAM 202.

A network interface (I/F) 205 is an interface between the information distribution apparatus 101 and the network 100. The information distribution apparatus 101 can execute network communication via the network I/F 205. An input/output I/F 206 is an interface with a keyboard and a display (not illustrated). Data can be input and output via the input/output I/F 206.

The information distribution apparatus 101 operates on basic input output system (BIOS) program and an operating system (OS) executed by the CPU 201. The BIOS program is stored on the ROM 203 while the OS is stored on the HDD 207.

When the information distribution apparatus 101 is powered on, an initial program loading function of the BIOS program is executed to load and execute the OS from the HDD 207 on the RAM 202. An application, which will be described in detail below, is an example of a program of the present invention. The format of the program of the present invention is not limited to the application. More specifically, firmware that controls a multifunction peripheral (MFP) can implement the program of the present invention.

Figure 3:
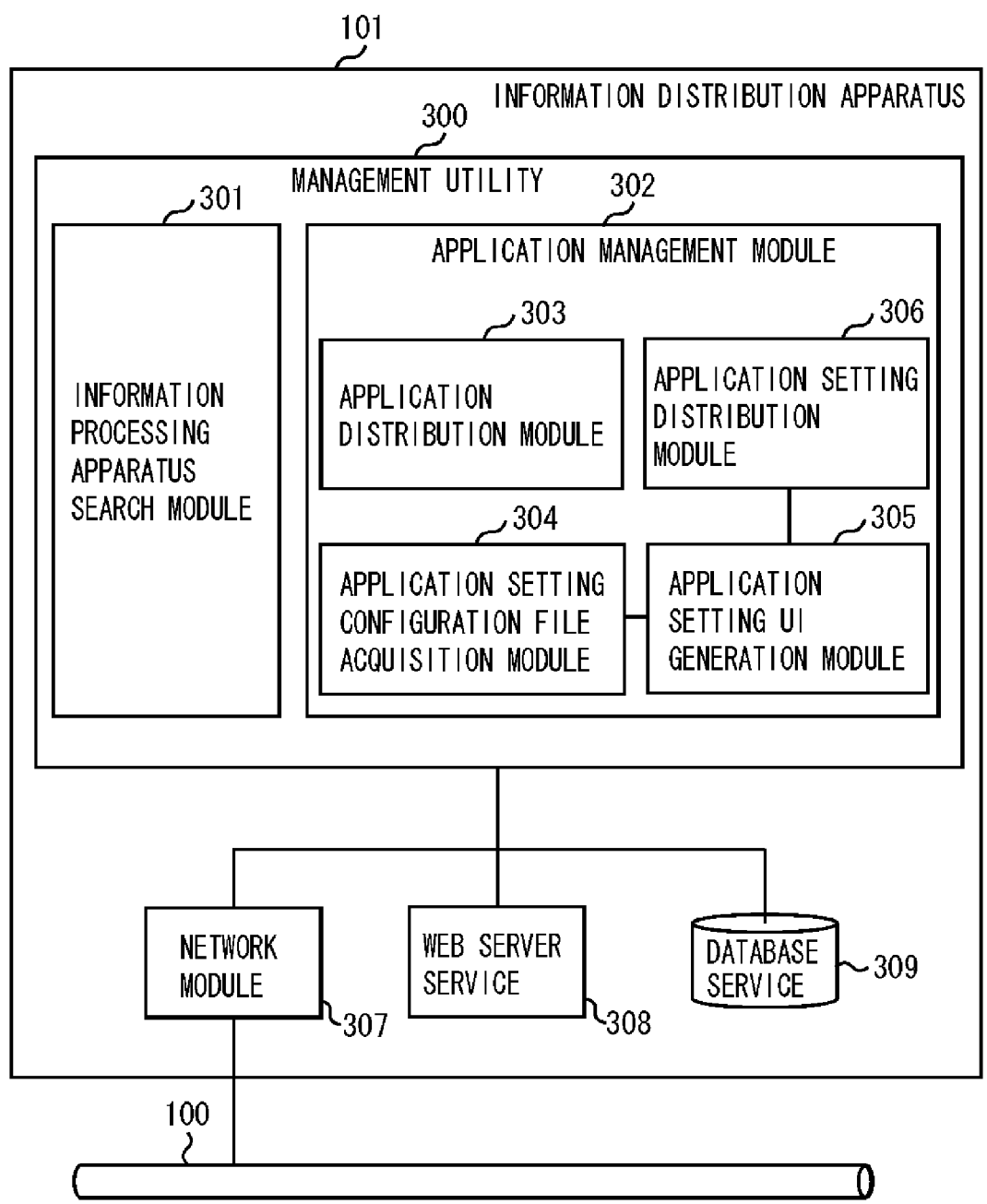
FIG. 3 illustrates an exemplary software configuration of the information distribution apparatus according to the first exemplary embodiment of the present invention.

FIG. 3 illustrates an exemplary software configuration of the information distribution apparatus 101.

Referring to FIG. 3, a management utility 300 is stored on the HDD 207 as a program. The management utility 300 includes an information processing apparatus search module 301 and an application management module 302.

The information processing apparatus search module 301 uses a network module 307 to search for an information processing apparatus 102, which is connected to the network 100. Further, the network module 307 acquires setting information about the information processing apparatus 102 extracted as a result of the search. The network module 307 stores the acquired setting information on a database service 309.

The application management module 302 manages the entire operation of the application installed on the information processing apparatus 102. The application management module 302 includes the application distribution module 303, the application setting configuration file acquisition module 304, the application setting user interface (UI) generation module 305, and the application setting distribution module 306.

The application distribution module 303 distributes the application (application program) to the information processing apparatus 102 via the network module 307.

The application setting configuration file acquisition module 304 acquires a setting configuration file (application setting configuration file) of the application installed on the information processing apparatus 102 via the network module 307.

The application setting UI generation module 305 generates a UI, via which a user inputs an application setting, based on the application setting configuration file acquired by the application setting configuration file acquisition module 304.

The application setting distribution module 306 distributes the application setting information input by the user via the UI generated by the application setting UI generation module 305 to the information processing apparatus 102 via the network module 307.

The network module 307 executes data communication with the information processing apparatus 102 via the network 100.

When a GET request by hypertext transport protocol (HTTP) is received from a web browser 600 (FIG. 6) of the client apparatus 103, a web server service 308 provides a service for transmitting web page data stored on the HDD 207. By using the web server service 308, an external apparatus can be connected to the information distribution apparatus 101 via the network 100.

A database service 309 manages data. Further, the database service 309 stores and retrieves the managed data according to a request from other modules. The database service 309 can be provided on an apparatus different from the information distribution apparatus 101 if the database service 309 can be accessed from the information distribution apparatus 101.

The management utility 300 is installed on the web server service 308 of the information distribution apparatus 101. By executing the management utility 300, the information distribution apparatus 101 can function as a management apparatus.

The management utility 300 is installed as a program for executing processing in response to the request for a web page, which is provided by the web server service 308. As described above, the management utility 300 implements a web application that manages the information processing apparatus 102, together with the web server service 308.

Figure 4:
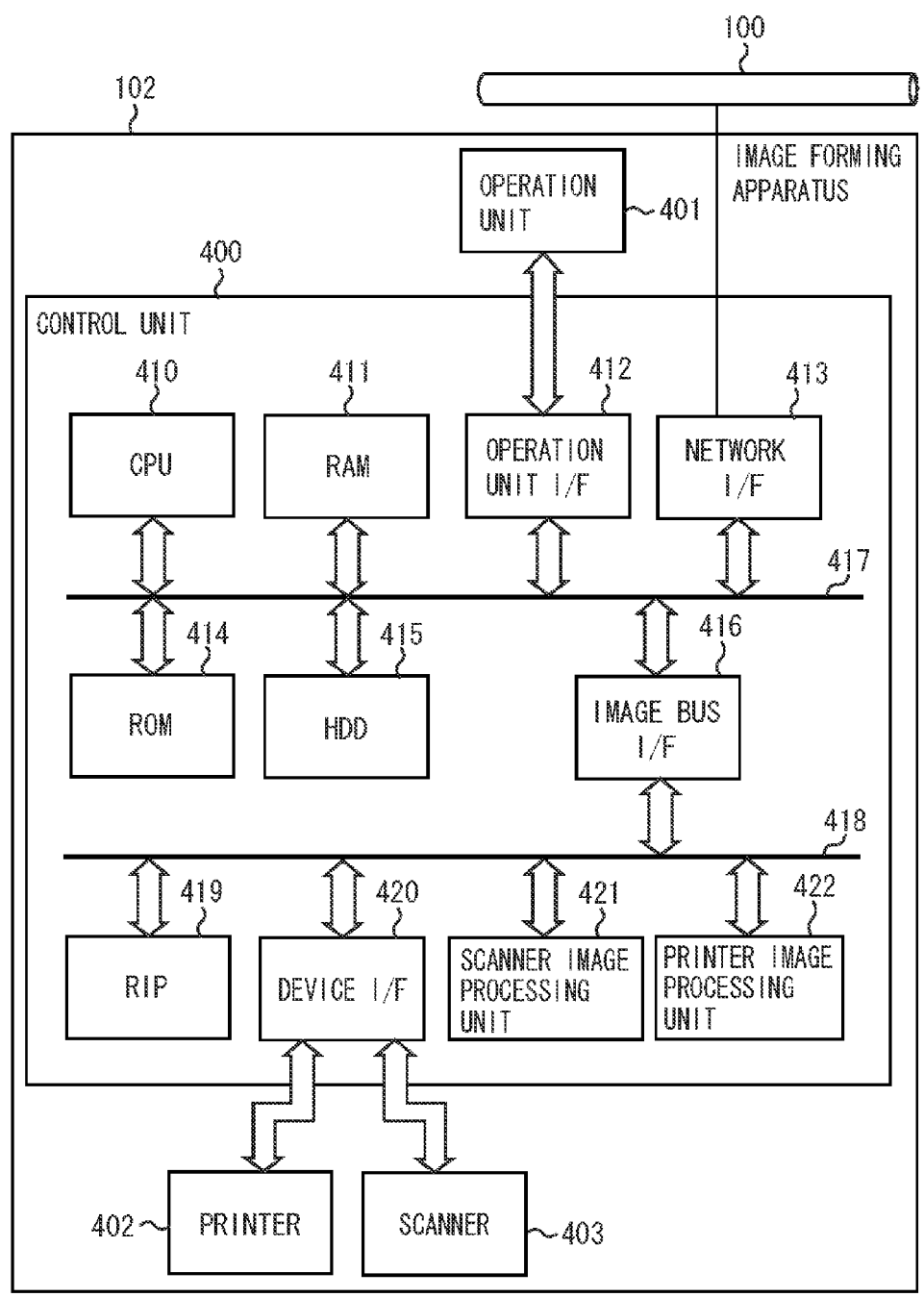
FIG. 4 illustrates an exemplary hardware configuration of an information processing apparatus according to the first exemplary embodiment of the present invention.

FIG. 4 illustrates an exemplary hardware configuration of the information processing apparatus 102.

Referring to FIG. 4, the information processing apparatus 102 includes a control unit 400, an operation unit 401, a printer 402, and a scanner 403.

The control unit 400 includes a CPU 410, a RAM 411, an operation unit I/F 412, a network I/F 413, a ROM 414, an HDD 415, an image bus I/F 416, and a system bus 417. In addition, the control unit 400 includes an image bus 418, a raster image processor (RIP) 419, a device I/F 420, a scanner image processing unit 421, and a printer image processing unit 422. It is also useful if the scanner 403 and the scanner image processing unit 421 are not provided.

The CPU 410 is a controller that controls the entire operation of the control unit 400. The RAM 411 is a system work memory that stores a program and data used for processing executed by the CPU 410. The RAM 411 also function as an image memory that temporarily stores image data.

The operation unit I/F 412 which is an interface with the operation unit 401 outputs image data to be displayed on the operation unit 401 thereto. Further, the operation unit I/F 412 transmits the information input by the user via the operation unit 401 to the CPU 410.

The network I/F 413 is an interface with the network 100 and controls input and output of information to and from the network 100. The ROM 414 is a boot ROM that stores a system boot program.

The hard disk drive (HDD) 415 stores system software and image data. The image bus I/F 416 mutually connects the system bus 417 and the image bus 418, which transits image data at a high speed. In addition, the image bus I/F 416 is a bus bridge for converting the structure of data.

The image bus 418 is a bus including a peripheral component interconnect (PCI) bus or Institute of Electrical and Electronic Engineers (IEEE) 1394. The raster image processor 419 rasterizes a page description language (PDL) command transmitted from the network 100 into a bitmap image.

The device I/F 420 mutually connects image input/output devices, such as the scanner 403 and the printer 402, and the control unit 400. In addition, the device I/F 420 executes synchronous/asynchronous conversion of image data. The scanner image processing unit 421 executes correction processing, image processing, and editing processing on input image data.

The printer image processing unit 422 executes correction processing and resolution conversion processing on image data to be printed and output according to performance of the printer 402.

Figure 5:
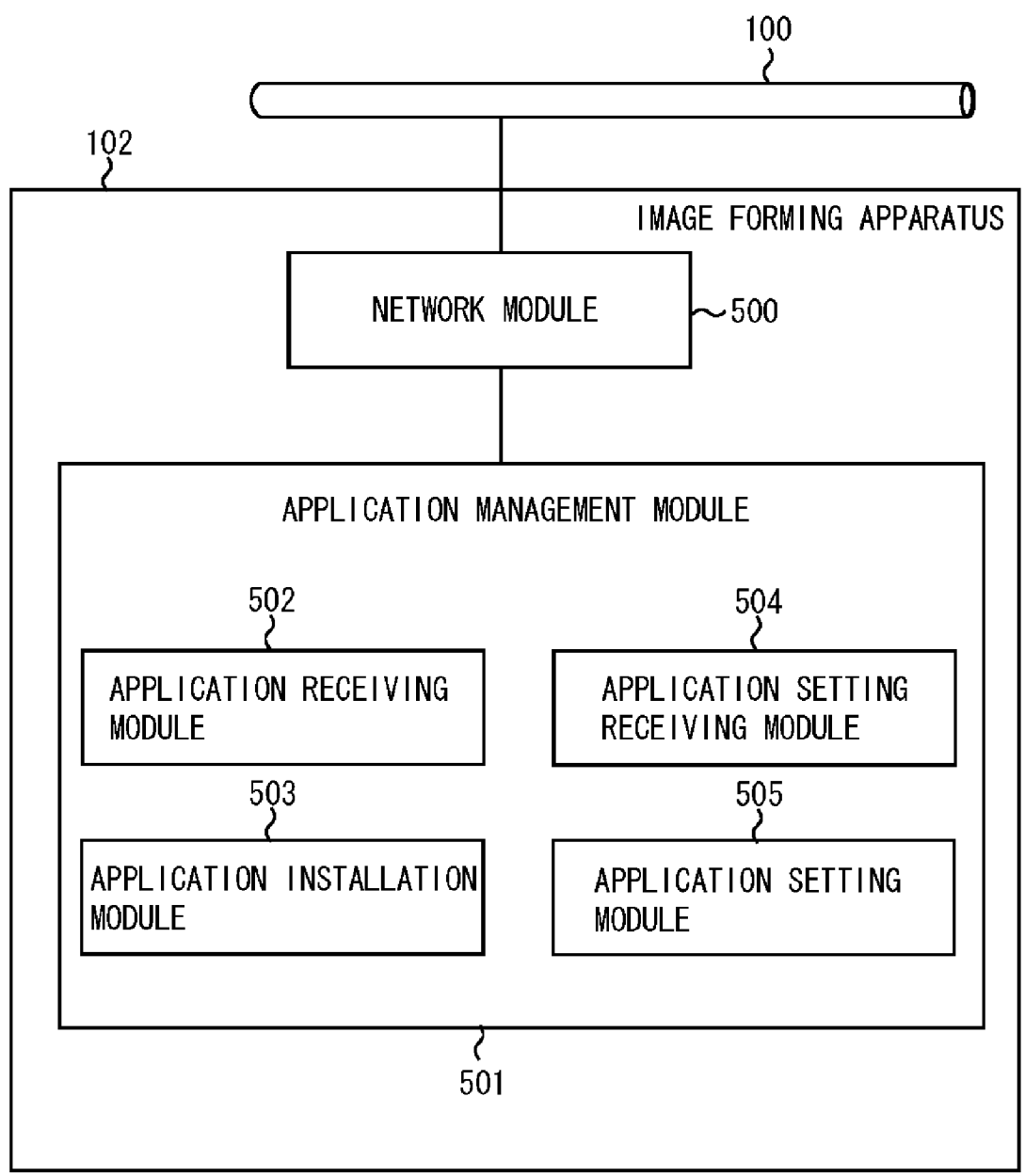
FIG. 5 illustrates an exemplary software configuration of the information processing apparatus according to the first exemplary embodiment of the present invention.

FIG. 5 illustrates an exemplary software configuration of the information processing apparatus 102.

Referring to FIG. 5, a network module 500 executes data communication with the information distribution apparatus 101 via the network 100. The application management module 501 manages an application (application program) installed on the information processing apparatus 102.

The application management module 501 includes an application receiving module 502, an application installation module 503, an application setting receiving module 504, and an application setting module 505.

Any application can be installed on the information processing apparatus 102 if the application can be installed on the information processing apparatus 102. More specifically, an application previously installed on the information processing apparatus 102, such as a web browser, and an application to be additionally installed on the information processing apparatus 102 on an as needed basis are included in the "application installed on the information processing apparatus 102" according to the present exemplary embodiment.

The application receiving module 502 receives an application and an application setting configuration file transmitted from the information distribution apparatus 101 via the network 100. In addition, the application receiving module 502 requests the application installation module 503 of installation of the application. Further, the application receiving module 502 requests the application setting module 505 of the management of the application setting configuration file.

The application installation module 503 verifies whether the application transmitted from the application receiving module 502 can be installed. If the application transmitted from the application receiving module 502 can be installed, then the application installation module 503 executes processing for installing the application.

The application setting receiving module 504 receives the application setting information transmitted from the information distribution apparatus 101 via the network 100. In addition, the application setting receiving module 504 requests the application setting module 505 of verification of the application setting information and reflection of the application setting information to the installed application.

The application setting module 505 stores the application setting configuration file transmitted from the application receiving module 502. In addition, the application setting module 505, based on the stored application setting configuration file, verifies whether the application setting information transmitted from the application setting receiving module 504 can be set to the application. If it is verified that the application setting information can be set to the application, then the application setting module 505 sets the application setting information to the installed application.

In the present exemplary embodiment, the application setting module 505 stores the application and the application setting configuration file. Thus, the present exemplary embodiment can implement a storage unit and a second storage unit by using the application setting module 505 having the above-described configuration.

As described above, the client apparatus 103 has the hardware configuration similar to that of a general-purpose computer. More specifically, the client apparatus 103 has a hardware configuration similar to that of the information distribution apparatus 101. Accordingly, the description thereof will not be repeated here.

Figure 6:
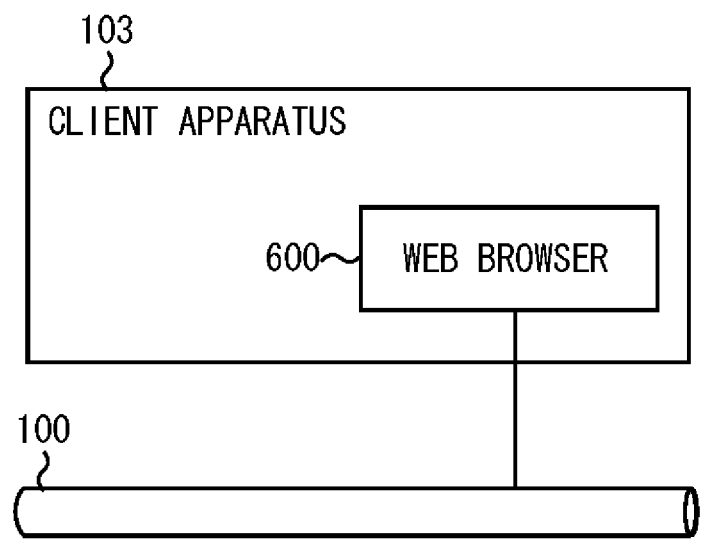
FIG. 6 illustrates an exemplary software configuration of a client apparatus according to the first exemplary embodiment of the present invention.

FIG. 6 illustrates an exemplary software configuration of the client apparatus 103. Referring to FIG. 6, the web browser 600 is stored on the HDD 207 as a program. The web browser 600 operates on the OS and is loaded and executed on the RAM 202. The client apparatus 103 can access the information distribution apparatus 101 via the web browser 600.

In the present exemplary embodiment, the information distribution apparatus 101, the information processing apparatus 102, and the client apparatus 103 have the configuration described above.

Now, an example of an operation of the information distribution apparatus 101 and the information processing apparatus 102 which is executed when the information distribution apparatus 101 distributes setting information of the application installed on the information processing apparatus 102 (application setting information) will be described in detail below.

FIG. 7 is a flow chart illustrating an example of an operation executed by the information distribution apparatus when application setting information is distributed.

Referring to FIG. 7, in step S700, the application setting configuration file acquisition module 304 acquires an application setting configuration file from the information processing apparatus 102 via the network module 307. The processing in step S700 is executed by transmitting a request for acquisition of an application setting configuration file to the information processing apparatus 102, for example.

The application setting configuration file defines data type and a settable range of a setting value of the application. FIG. 8 illustrates an example of an application setting configuration file defined as an XML schema according to the present exemplary embodiment.

As described above, in the present exemplary embodiment, an exemplary acquisition unit of the information distribution apparatus 101 can be implemented by executing the processing in step S700.

In addition, in the present exemplary embodiment, the data type and the settable range of the setting value of the application which are included in the application setting configuration file can implement an example of information indicating a condition describing an applicable range of the setting value of the application.

In step S701, the application setting configuration file acquisition module 304 determines whether the application setting configuration file of the installed application has been acquired from the information processing apparatus 102.

If it is determined that the application setting configuration file of the installed application has been acquired from the information processing apparatus 102 (YES in step S701), then the application setting configuration file acquisition module 304 determines that the application setting information can be distributed. Then, the processing advances to step S702.

On the other hand, if it is determined that the application setting configuration file of the installed application has not been acquired (NO in step S701), then the application setting configuration file acquisition module 304 determines that the application installed on the information processing apparatus 102 does not have a setting value. Then, the application setting distribution processing ends.

In step S702, the application setting UI generation module 305 generates and displays a user input UI. When the UI is generated, the application setting UI generation module 305 uses the application setting configuration file acquired from the information processing apparatus 102 in step S700.

Figure 9:
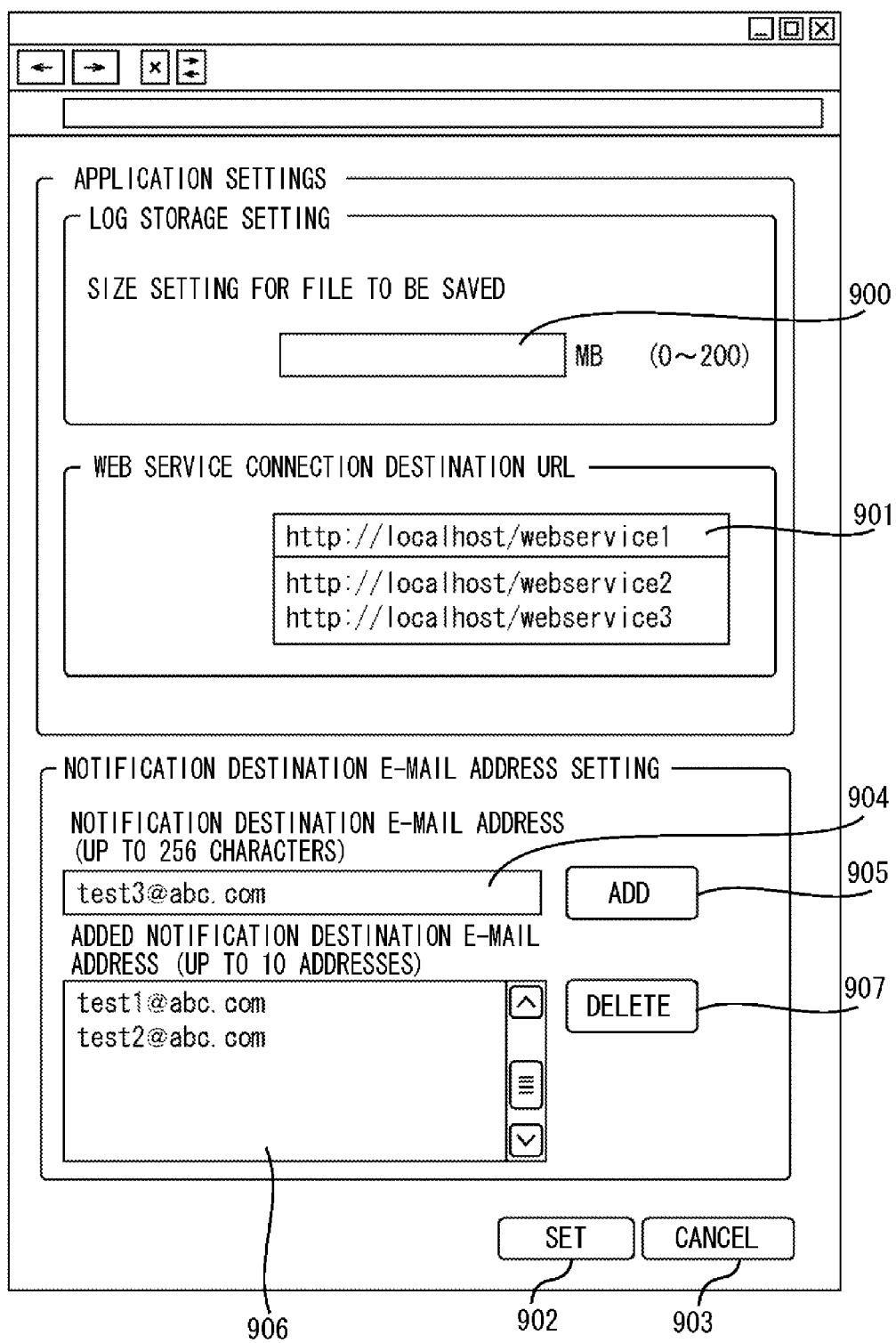
FIG. 9 illustrates an example of a user interface (UI) generated based on the application setting configuration file illustrated in FIG. 8 according to the first exemplary embodiment of the present invention.

FIG. 9 illustrates an example of a UI generated based on the application setting configuration file illustrated in FIG. 8 according to the present exemplary embodiment. In the example illustrated in FIG. 9, the UI is displayed on the web browser 600 of the client apparatus 103.

Referring to FIG. 9, in a "size setting for file to be saved" field 900 included in a log storage setting field of an application setting field, the user can enter a value only from "0" to "200" which are defined in descriptions "minExclusive value" and "maxExclusive value" of a description 801 of the application setting configuration file illustrated in FIG. 8.

In a web service connection destination uniform resource locator (URL) selection field 901, the user can select a URL only from among URLs described in a description "enumeration value" 802 of the application setting configuration file illustrated in FIG. 8.

A notification destination e-mail address input text box 904 is a text box for entering a notification destination e-mail address, to which an e-mail is to be sent by the application. In the example illustrated in FIG. 9, the user can enter an e-mail address of 256 characters or less based on a description "maxLength Value" 803 of the application setting configuration file illustrated in FIG. 8. The above-described information is an example of status information.

When a notification destination e-mail address adding button 905 is pressed, the e-mail address entered in the notification destination e-mail address input text box 904 is added to an added notification destination e-mail address display text box 906.

In the example illustrated in FIG. 9, the user can add up to ten addresses into the added notification destination e-mail address display text box 906 based on the application setting configuration file illustrated in FIG. 8.

When the user presses a notification destination e-mail address deletion button 907, an e-mail address currently selected in the added notification destination e-mail address display text box 906 is deleted therefrom.

When the user presses a set button 902, values entered in the "size setting for file to be saved" field 900, the web service connection destination URL selection field 901, and the added notification destination e-mail address display text box 906 are transmitted to the application setting distribution module 306. Then, the processing advances to step S703. When the user presses a cancel button 903, then the application setting input processing is cancelled.

In the present exemplary embodiment, the above-described processing in step S702 can implement an exemplary display unit.

Returning to FIG. 7, in step S703, the application setting distribution module 306 verifies the setting value input by the user via the UI generated in step S702 based on the application setting configuration file acquired in step S700.

If the setting value input by the user matches the data type and the settable range of the setting value of the application which are defined in the application setting configuration file, then it is determined that the verification of the setting value is successful. If not, it is determined that the verification of the setting value is failed.

In step S704, the application setting distribution module 306 determines whether the verification of the setting value is successful based on the result of the verification in step S703. If it is determined that the verification is successful (YES in step S704), then the processing advances to step S706. On the other hand, if it is determined that the verification is failed (NO in step S704), then the application setting UI generation module 305 displays a message indicating failure in the verification on the UI. Then, the application setting distribution processing ends.

In the present exemplary embodiment, by executing the processing in step S704 described above, an exemplary verification unit of an information distribution apparatus can be implemented.

In step S705, the application setting distribution module 306 distributes the application setting information including the verified "application setting value" to the information processing apparatus 102 via the network I/F 205. Then, the application setting distribution processing ends.

In the present exemplary embodiment, by executing the processing in step S705 described above, an exemplary distribution unit can be implemented.

Figure 10:
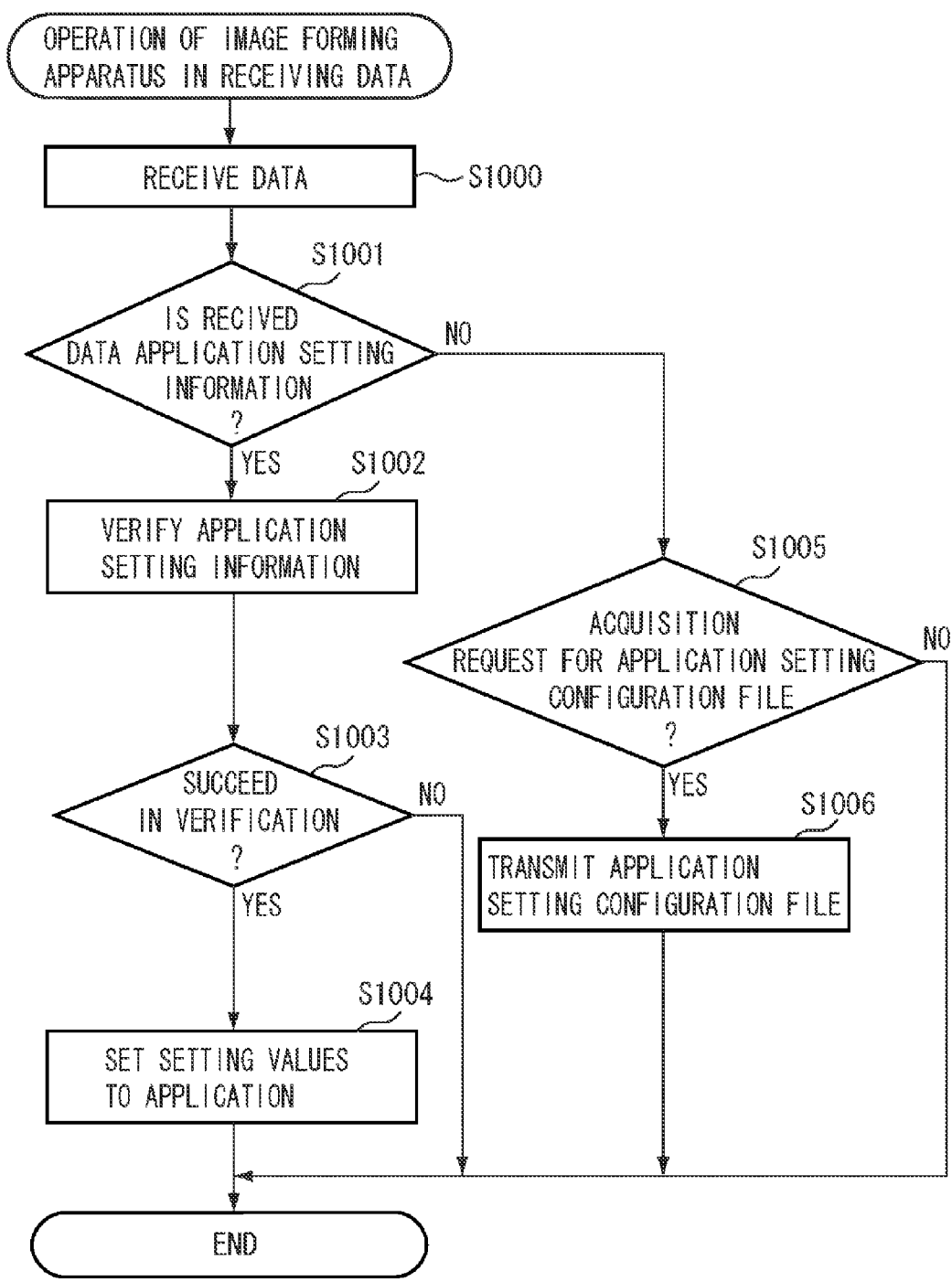
FIG. 10 is a flow chart illustrating an example of an operation executed by the information processing apparatus when data distributed from the information distribution apparatus is received according to the first exemplary embodiment of the present invention.

FIG. 10 is a flow chart illustrating an example of an operation executed by the information processing apparatus 102 when data transmitted from the information distribution apparatus 101 is received.

Referring to FIG. 10, in step S1000, the application setting receiving module 504 receives the data transmitted from the information distribution apparatus 101 via the network I/F 413. In step S1001, the application setting receiving module 504 determines whether the received data is the application setting information (the setting value of the application).

If it is determined that the received data is the application setting information (the setting value of the application) (YES in step S1001), then the processing advances to step S1002. On the other hand, if it is determined that the received data is not the application setting information (the setting value of the application) (NO in step S1001), then the processing advances to step S1005.

In step S1002, the application setting module 505 verifies the application setting information received in step S1000. In the verification of the application setting information in step S1000, the application setting module 505 uses the application setting configuration file stored thereon.

In the present exemplary embodiment, an application setting configuration file defines the data type and the settable range of the setting value of the application as illustrated in FIG. 8. The application setting configuration file is stored on the application setting module 505 when the application is installed.

If the verification of the application setting information is executed based on the application setting configuration file illustrated in FIG. 8, then it is determined that the verification is successful if a parameter "MaxTotalLogSize", which indicates the maximum value of the size of the log file held by the application, has a value within the range of values from "0" to "200". On the other hand, if the parameter "MaxTotalLogSize" does not have a value within the range of values from "0" to "200", then it is determined that the verification is failed.

By executing the processing in step S1002 described above, the present exemplary embodiment can recognize if application setting information is changed or if the application setting configuration file is changed by modification or falsification during the data communication after the verification by the information distribution apparatus 101 and before the processing in step S1002.

In step S1003, the application setting module 505 determines that the application setting information is normally verified based on the result of the verification in step S1002. If it is determined that the verification is successful (YES in step S1002), then the processing advances to step S1004. On the other hand, if it is determined that the verification is failed (NO in step S1002), then the application management module 501 displays a message indicating failure in the verification on the UI. Then, the processing ends.

In the present exemplary embodiment, by executing the processing in step S1003, an exemplary verification unit of the information processing apparatus can be implemented.

In step S1004, the application setting module 505 sets the "application setting value" included in the verified application setting information to the application installed on the information processing apparatus 102. Then, the above-described processing, which is executed when an application setting is received, ends.

In the present exemplary embodiment, by executing the processing in step S1004 described above, an exemplary setting unit can be implemented.

As described above, if it is determined that the received data is not the application setting information (application setting value) (NO in step S1001), then the processing advances to step S1005.

In step S1005, the application setting receiving module 504 determines whether the received data is a request for acquisition of the application setting configuration file.

If it is determined that the received data is the request for acquisition of the application setting configuration file (YES in step S1005), then the processing advances to step S1006. On the other hand, if it is determined that the received data is not the request for acquisition of the application setting configuration file (NO in step S1005), then the above-described processing, which is executed when an application setting is received, ends.

In step S1006, the application setting module 505 transmits the requested application setting configuration information to the information distribution apparatus 101 via the network I/F 413. Then, the above-described processing, which is executed when an application setting is received, ends.

As described above, in the present exemplary embodiment, the information distribution apparatus 101 acquires the information about the data type and the settable range of the setting value of the application installed on the information processing apparatus 102 as an application setting configuration file. In addition, the information distribution apparatus 101 generates a UI based on the acquired application setting configuration file.

In addition, if the information inputted into the UI matches the content of the application setting configuration file, then the information distribution apparatus 101 distributes the application setting information (the application setting value) corresponding to the application setting configuration file to the information processing apparatus 102.

Accordingly, the information distribution apparatus 101 can verify whether the "application setting value" entered by the user is appropriate for the application installed on the information processing apparatus 102 before transmitting the setting value of the application.

As described above, the present exemplary embodiment can transmit, to the information processing apparatus 102, the data appropriate for the program installed on the information distribution apparatus 101 as data to be used in the setting of the program.

Accordingly, the present exemplary embodiment can distribute, to the information processing apparatus 102, data appropriate for the program installed on the information processing apparatus 102 as data to be used in the setting of the program.

Now, a second exemplary embodiment of the present invention will be described in detail below.

In the first exemplary embodiment described above, if the information processing apparatus 102 receives a request for acquisition of an application setting configuration file from the information distribution apparatus 101, the information processing apparatus 102 transmits an application setting configuration file as it is.

On the other hand, in the present exemplary embodiment, if a request for acquisition of an application setting configuration file is received from the information distribution apparatus 101, then the information processing apparatus 102 converts the application setting configuration file according to the setting and the status of the information processing apparatus 102 and transmits the converted application setting configuration file to the information distribution apparatus 101.

As described above, the configuration related to the application setting configuration file and the processing executed thereon primarily differ from those of the above-described first exemplary embodiment.

Accordingly, in the present exemplary embodiment, units, components, and steps similar to those of the first exemplary embodiment are provided with the same reference numerals and symbols illustrated in FIGS. 1 through 10 and the detailed descriptions thereof will not be repeated here. More specifically, the operation of the information distribution apparatus 101 is similar to that of the first exemplary embodiment. Accordingly, the description thereof will not be repeated.

FIG. 11 is a flow chart illustrating an example of an operation executed by the information processing apparatus 102 when data from the information distribution apparatus 101 is received according to the present exemplary embodiment. The processing in steps S1000 through S1006 illustrated in FIG. 11 is similar to that of the first exemplary embodiment FIG. 10.

Referring to FIG. 11, after receiving the data from the information distribution apparatus 101 in step S1000, the application setting module 505, in step S1100, acquires setting information about the information processing apparatus 102, which is performed for converting the application setting configuration file.

In the present exemplary embodiment, by executing the processing in step S1100, an exemplary acquisition unit of the information processing apparatus can be implemented. In addition, in the present exemplary embodiment, the setting information about the information processing apparatus 102 can implement exemplary status information that indicates at least one of the status and the setting of the information processing apparatus 102 which affects the application setting value.

In step S1101, the application setting module 505 converts the application setting configuration file based on the setting information acquired in step S1100. In the following description, as exemplary application setting configuration file conversion processing, processing for converting the setting value defined based on the setting information about the information processing apparatus 102 and processing for adding or deleting a definition will be described in detail.

In the present exemplary embodiment, the method for converting the file is not limited to a specific method. More specifically, extensible stylesheet language transformations (XSLT), which is a simple language for converting an XML document into another XML document format, or an arbitrary script can be used.

As exemplary processing for converting the setting value defined in an application setting configuration file, the following example will be described in detail below. More specifically, in the exemplary processing, a maximum value of a defined parameter is determined according to capacity of the HDD 415 of the information processing apparatus 102 or the network setting.

In the present exemplary embodiment, it is supposed that the application setting configuration file includes definitions of the maximum total file size of the log files that the application can store and the web service connection destination URL as setting values. Further, it is supposed that the maximum total file size of the log file dynamically varies according to the capacity of the HDD 415 and the web service connection destination URL dynamically varies according to the network setting.

In this case, in step S1100, the application setting module 505 acquires a free disk space of the HDD 415 of the information processing apparatus 102 and the network setting.

In step S1101, the application setting module 505 convert the setting value defined in the application setting configuration file based on the free disk space of the HDD 415 and the network setting acquired in step S1100.

FIG. 12 illustrates an example of an application setting configuration file which is obtained by converting the application setting configuration file illustrated in FIG. 8 according to the setting of the information processing apparatus 102.

In the application setting configuration file illustrated in FIG. 12, the maximum total log file size is converted into "80 MB" according to the free disk space of the HDD 415. In addition, the web service connection destination URL is converted according to the setting of the network connection destination.

As described above, in the present exemplary embodiment, the URL is changed according to the setting of the network connection destination. Further, the setting value corresponding to the free disk space of the HDD 415 is set to the application setting configuration file.

However, the present exemplary embodiment is not limited to the above. A condition for verifying a default print setting value may be changed according to the presence or absence of an optional device. More specifically, the following method (condition) can be used.

If a side paper deck is provided to the information processing apparatus 102, the side paper deck can be set as a default setting value of the paper feed unit. On the other hand, if the information processing apparatus 102 includes no side paper deck, the side paper deck cannot be set as a default setting value of the paper feed unit.

As the optional device, a paper discharge unit can be used in addition to the paper feed unit. Further, a printer language board, which can be mounted as an expansion, can be used as the optional device.

In addition to, or instead of the free disk space of the HDD 415, a setting value corresponding to the memory capacity of the RAM 202 of the information processing apparatus 102 may be set to the application setting configuration file.

Now, the exemplary processing for adding or deleting a definition to or from the application setting configuration file will be described in detail below. In the present exemplary embodiment, a definition of an interval for uploading a log file on a server is added to or deleted from the application setting configuration file according to the capacity of the HDD 415 of the information processing apparatus 102.

It is supposed that the application has the following specification. More specifically, it is defined to store a log file on the HDD 415 of the information processing apparatus 102 if the HDD 415 has a large capacity. On the other hand, if the capacity of the HDD 415 is small, it is defined that the application uploads the log file onto a specific server at a predetermined time interval and deletes a log file from the HDD 415.

In this case, in step S1100, the application setting module 505 acquires the free disk space of the HDD 415 of the information processing apparatus 102.

In step S1101, if the free disk space of the HDD 415 acquired in step S1100 is smaller than a predetermined arbitrary threshold value, then the application setting module 505 adds a definition of the setting value of the interval for uploading a log file to the application setting configuration file.

FIG. 13 illustrates an example of an application setting configuration file, which is obtained by adding a definition of an item, such as "every hour" "every day", "every week", or "every month", to the application setting configuration file illustrated in FIG. 8 as a setting value of the log file uploading interval.

On the other hand, if the free disk space of the HDD 415 becomes equal to or greater than the predetermined arbitrary threshold value, then the application setting module 505 deletes the definition of the setting value of the log file uploading interval from the application setting configuration file.

The processing will be described in detail below. If the free disk space of the HDD 415 is equal to or greater than 200 MB, then the present exemplary embodiment includes four setting items, such as "every hour" "every day", "every week", and "every month", in the application setting configuration file.

If the free disk space of the HDD 415 is equal to or greater than 100 MB, then the present exemplary embodiment deletes two setting items, such as "every hour" and "every day", from the application setting configuration file. In this case, two setting items, such as "every week" and "every month", are included in the application setting configuration file.

As described above, the present exemplary embodiment can set the uploading interval of a log file according to the free disk space of the HDD 415. Accordingly, the user is allowed only to set the setting for uploading a log file in the size corresponding to the acquired free disk space of the HDD 415.

In the present exemplary embodiment, the application setting configuration file is converted according to one type of setting information, such as the free disk space of the HDD 415. However, the present exemplary embodiment is not limited to this example. The application setting configuration file may be converted according to a plurality of types of setting information.

In the present exemplary embodiment, by executing the processing in step S1101 described above, an exemplary changing unit of the information distribution apparatus can be implemented.

The processing in step S1101 and beyond for verifying and setting the setting value of the application and transmitting the application setting configuration file is similar to that of the first exemplary embodiment. Accordingly, the description thereof will not be repeated here.

As described above, in the present exemplary embodiment, the information processing apparatus 102 dynamically changes the data type and the settable range of the setting value of the application according to the setting and the status of the information processing apparatus 102.

In addition, when the setting value of the application that has been installed on the information processing apparatus 102 is distributed to the information processing apparatus 102, the information distribution apparatus 101 receives the application setting configuration file which has been changed according to the setting and the status of the information processing apparatus 102, and can verify the setting value.

Accordingly, if the information processing apparatus 102 dynamically changes the data type and the settable range of the setting value of the application, the information distribution apparatus 101 can distribute the setting value compliant with the application installed on the information processing apparatus 102 to the information processing apparatus 102.

It is also useful if the processing in steps S1001 and S1101 is executed at timing between the processing in steps S1001 through S1005.

Now, a third exemplary embodiment of the present invention will be described in detail below. In the above-described second exemplary embodiment, if the application setting configuration file is dynamically changed according to the setting and the status of the information processing apparatus 102, the information processing apparatus 102 converts the application setting configuration file and transmits the converted application setting configuration file to the information distribution apparatus 101.

On the other hand, in the present exemplary embodiment, the information distribution apparatus 101 converts the application setting configuration file instead of the information processing apparatus 102 to reduce the processing load thereon.

As described above, the configuration related to the conversion of the application setting configuration file and the processing executed for the conversion thereof primarily differ from those of the above-described second exemplary embodiment.

Accordingly, in the present exemplary embodiment, units, components, and steps similar to those of the first and second exemplary embodiments described above are provided with the same reference numerals and symbols illustrated in FIGS. 1 through 13 and the detailed descriptions thereof will not be repeated here.

For example, the system configuration of the information distribution apparatus 101 and the information processing apparatus 102 is similar to that of the first exemplary embodiment except for the software configuration thereof. Accordingly, the description of the system configuration thereof will not be repeated.

Further, the operation of the information processing apparatus 102 is similar to that of the second exemplary embodiment. Accordingly, the description thereof will not be repeated.

Figure 14:
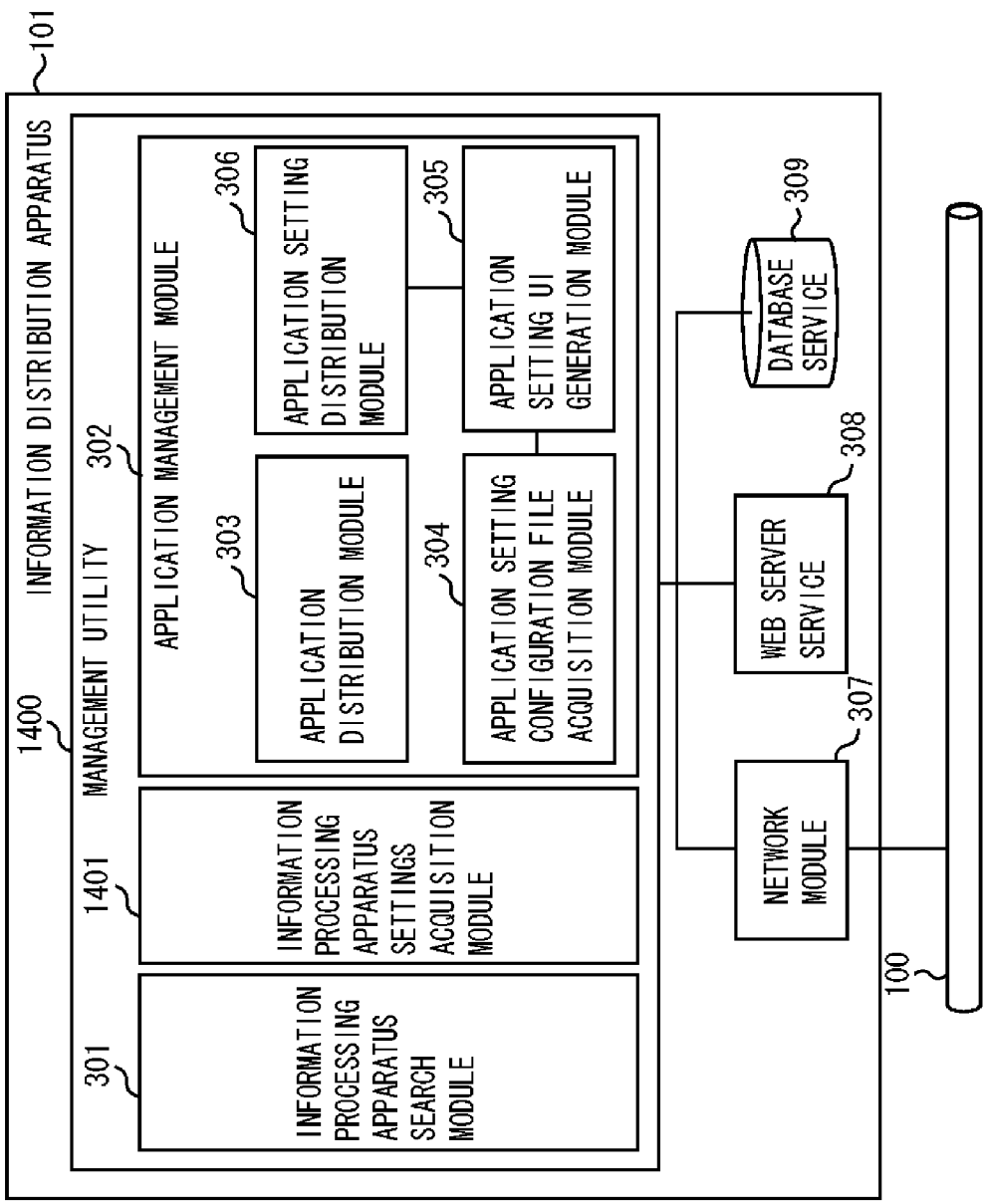
FIG. 14 illustrates an exemplary software configuration of an information distribution apparatus according to a third exemplary embodiment of the present invention.

FIG. 14 illustrates an exemplary software configuration of the information distribution apparatus 101. Except for including an information processing apparatus setting acquisition module 1401, the configuration of the information distribution apparatus 101 according to the present exemplary embodiment is similar to that of the information distribution apparatus 101 according to the first exemplary embodiment (FIG. 3). Accordingly, the description of the configuration similar to the first exemplary embodiment will not be repeated.

The information processing apparatus setting acquisition module 1401 acquires the setting information about the information processing apparatus 102 from the information processing apparatus 102 via the network module 307.

When the setting information about the information processing apparatus 102 is acquired, the information processing apparatus setting acquisition module 1401 may acquire information other than the setting information if information used for conversion of the application setting configuration file is acquired.

The acquired setting information about the information processing apparatus 102 is used during conversion of the application setting configuration file.

Figure 15:
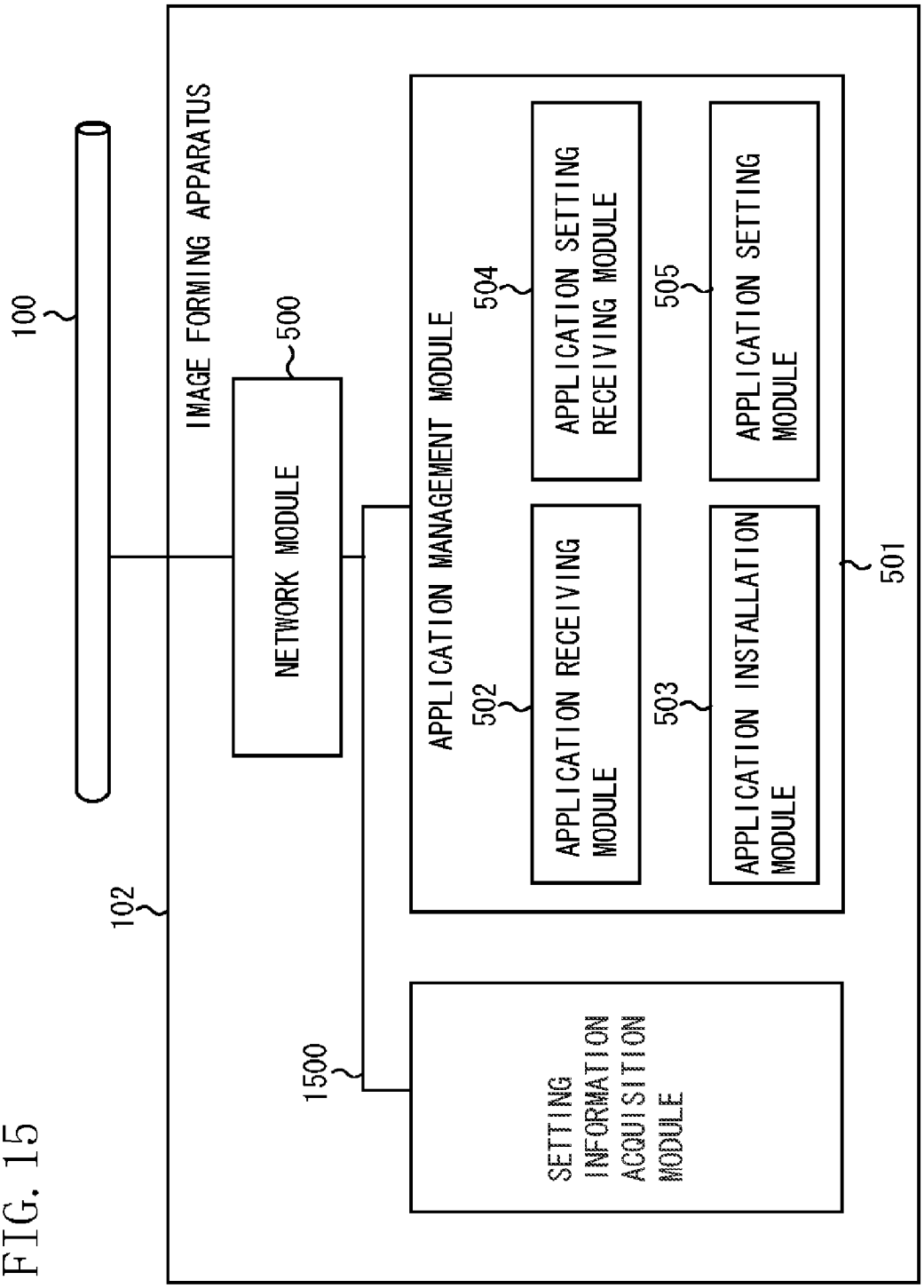
FIG. 15 illustrates an exemplary software configuration of an information processing apparatus according to the third exemplary embodiment of the present invention.

FIG. 15 illustrates an exemplary software configuration of the information processing apparatus 102. Except for including a setting information acquisition module 1500, the configuration of the information processing apparatus 102 according to the present exemplary embodiment is similar to that of the information processing apparatus 102 according to the first exemplary embodiment (FIG. 5). Accordingly, the description of the configuration similar to the first exemplary embodiment will not be repeated here.

The setting information acquisition module 1500 acquires the setting information about the information processing apparatus 102 according to a request from the information distribution apparatus 101. Further, the setting information acquisition module 1500 transmits the setting information to the information distribution apparatus 101 via the network module 307.

When the setting information about the information processing apparatus 102 is acquired, the setting information acquisition module 1500 may acquire information other than the setting information if information used for conversion of the application setting configuration file is acquired Now, an example of the operation of the information distribution apparatus 101 executed when the information distribution apparatus 101 distributes the application setting information about the application installed on the information processing apparatus 102 will be described in detail below.

FIG. 16 is a flow chart illustrating an example of an operation executed by the information distribution apparatus 101 when application setting information is distributed. The processing in steps S700 through S705 illustrated in FIG. 16 is similar to that of the first exemplary embodiment (FIG. 7). Accordingly, the description thereof will not be repeated.

Referring to FIG. 16, after acquiring the application setting configuration file, in step S1600, the information processing apparatus setting acquisition module 1401 acquires the setting information about the information processing apparatus 102 therefrom. The setting information about the information processing apparatus 102 acquired in step S1600 includes the setting information used for converting the application setting configuration file.

In the present exemplary embodiment, by executing the processing in step S1600 described above, an exemplary second acquisition unit can be implemented.

In addition, in the present exemplary embodiment, the setting information about the information processing apparatus 102 can implement exemplary status information that indicates at least one of the status and the setting of the information processing apparatus 102 which affects the application setting value.

In step S1601, the application setting configuration file acquisition module 304 converts the application setting configuration file based on the setting information about the information processing apparatus 102 acquired in step S1600.

As described in the second exemplary embodiment, the converted application setting configuration files illustrated in FIGS. 12 and 13 are obtained.

In the present exemplary embodiment, the method for converting the file is not limited to a specific method. More specifically, XSLT, which is a simple language for converting an XML document into another XML document format, or an arbitrary script can be used as in the second exemplary embodiment.

In the present exemplary embodiment, the same log file uploading interval as that of the second exemplary embodiment can be used. More specifically, if the free disk space of the HDD 415 is equal to or greater than 200 MB, then the present exemplary embodiment includes four setting items, such as "every hour" "every day", "every week", and "every month", in the application setting configuration file.

If the free disk space of the HDD 415 is equal to or greater than 100 MB, then the present exemplary embodiment deletes two setting items, such as "every hour" and "every day", from the application setting configuration file. In this case, two setting items, such as "every week" and "every month", are included in the application setting configuration file.

As described above, the present exemplary embodiment can set the uploading interval of a log file according to the free disk space of the HDD 415. Accordingly, the user is allowed only to set the setting for uploading a log file in the size corresponding to the acquired free disk space of the HDD 415.

In the present exemplary embodiment, by executing the processing in step S1601 described above, an exemplary changing unit of the information processing apparatus can be implemented.

Now, timing for the information distribution apparatus 101 to acquire the application setting configuration file from the information processing apparatus 102 will be described in detail below.

If the status information about the information processing apparatus 102 has varied, the information processing apparatus 102 transmits the application setting configuration file to the information distribution apparatus 101. More specifically, if the free disk space of the HDD 415 of an image forming apparatus 102 has varied, the image forming apparatus 102 transmits the varied free disk space of the HDD 415 to the information distribution apparatus 101.

The processing in step S1601 and beyond for generating the UI and verifying and transmitting the setting value of the application is similar to that of the first exemplary embodiment. Accordingly, the description thereof will not be repeated.

As described above, in the present exemplary embodiment, the information distribution apparatus 101 acquires the application setting configuration file and the setting information about the information processing apparatus 102.

Further, in the present exemplary embodiment, the information processing apparatus 102 dynamically changes the application setting configuration file (the data type and the settable range of the setting value of the application) according to the setting and the status of the information processing apparatus 102.

Accordingly, the present exemplary embodiment can achieve not only an effect by the second exemplary embodiment described above but also an effect of reducing a processing load of the information processing apparatus 102 at the same time.

In the present invention, each of the information processing apparatus 102 and the information distribution apparatus 101 may include a plurality of CPUs.

In the second and third exemplary embodiments of the present invention described above, the maximum total size of the log file included in the application setting configuration file is varied according to the free disk space of the HDD 415.

However, the present invention is not limited to the above embodiments. The application setting configuration file may be changed if the free disk space is increased by adding another HDD 415. In this case, the status information is updated. Further, if the free disk space of the HDD 415 is varied due to a cause other than those described above, the application setting configuration file may be changed.

Note that the present invention can be implemented by directly or remotely supplying a program of software implementing functions of the above-described exemplary embodiments (in the exemplary embodiments, the program corresponding to the processing performed according to the flow charts in FIGS. 7, 10, 11, and 16) to a system or an apparatus and reading and executing supplied program codes with the system or a computer of the apparatus.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2009-017095 filed Jan. 28, 2009, and No. 2009-255139 filed Nov. 6, 2009, which are hereby incorporated by reference herein in their entirety.

What is claimed is:

1. An information distribution apparatus configured to distribute a setting value of a program installed on an image forming apparatus to the image forming apparatus, the information distribution apparatus comprising:
   an acquisition unit configured to send a request for an application setting configuration file and acquire an application setting configuration file set for the program installed on the image forming apparatus as a response to the request and status information of the image forming apparatus;
   a definition unit configured to deletes an unnecessary definition which is not to be set as a setting value for the image forming apparatus from among the candidate definitions in accordance with the acquired status information of the image forming apparatus;
   a screen providing unit configured to provide an application setting screen based on the application setting configuration file with the unnecessary definition deleted by the definition unit;
   a verification unit configured to verify whether or not a definition set via the application setting screen is applicable to the program based on the acquired application setting configuration file; and
   a distribution unit configured, if the verification indicates that the definition set via the application setting screen is applicable to the program, to distribute the definition set as the setting value via the application setting screen to the image forming apparatus,
   wherein the application setting configuration file defines candidate definitions as a setting value applicable to the program, wherein the acquisition unit acquires the application setting configuration file defining a definition candidate as a setting value to set a time interval for the image forming apparatus to upload a log file and information on a free disc space of the image forming apparatus, and
   wherein the unnecessary definition is not be able to be set as the setting value for the image forming apparatus in the provided application setting screen.

2. The information distribution apparatus according claim 1,
   wherein the definition unit deletes a definition candidate defining a short time interval from the application setting configuration file in a case where the free disc space of the image forming apparatus is smaller than a predetermined threshold value, and
   wherein the definition candidate defining the short time interval is not able to be set as the setting value for the image forming apparatus in the application setting screen.

3. The information distribution apparatus according to claim 2,
   wherein the definition unit adds a definition candidate defining a long time interval in the application setting configuration file in a case where the free disc space of the image forming apparatus is equal to or greater than the predetermined threshold value, and
   wherein the definition candidate defining the long time interval is able to be set as the setting value for the image forming apparatus in the application setting screen.

4. A method for distributing to an image forming apparatus a setting value of a program installed on the image forming apparatus, the method comprising:
   sending a request for an application setting configuration file and acquiring an application setting configuration file set for the program installed on the image forming apparatus as a response to the request and status information of the image forming apparatus;
   deleting an unnecessary definition which is not to be set as a setting value for the image forming apparatus from among the candidate definitions in accordance with the acquired status information of the image forming apparatus;
   providing an application setting screen based on the application setting configuration file with the deleted unnecessary definition,
   verifying whether or not a definition set via the application setting screen is applicable to the program based on the acquired application setting configuration file; and
   distributing, if the verification indicates that the definition set via the application setting screen is applicable to the program, the definition set as the setting value via the application setting screen to the image forming apparatus,
   wherein the application setting configuration file defines candidate definitions as a setting value applicable to the program, wherein the acquiring acquires the application setting configuration file defining a definition candidate as a setting value to set a time interval for the image forming apparatus to upload a log file and information on a free disc space of the image forming apparatus, and
   wherein the unnecessary definition is not be able to be set as the setting value for the image forming apparatus in the provided application setting screen.

5. The method according to claim 4,
   wherein the deleting deletes a definition candidate defining a short time interval from the application setting configuration file in a case where the free disc space of the image forming apparatus is smaller than a predetermined threshold value, and
   wherein the definition candidate defining the short time interval is not able to be set as the setting value for the image forming apparatus in the application setting screen.

6. The method according to claim 5, further comprising:
   adding a definition candidate defining a long time interval in the application setting configuration file in a case where the free disc space of the image forming apparatus is equal to or greater than the predetermined threshold value,
   wherein the definition candidate defining the long time interval is able to be set as the setting value for the image forming apparatus in the application setting screen.

7. A non-transitory computer-readable storage medium storing a program for executing a method for distributing to an image forming apparatus information which is a setting value of a program installed on the image forming apparatus, the method comprising:
   sending a request for an application setting configuration file and acquiring an application setting configuration file set for the program installed on the image forming apparatus as a response to the request and status information of the image forming apparatus;
deleting an unnecessary definition which is not to be set as a setting value for the image forming apparatus from among the candidate definitions in accordance with the acquired status information of the image forming apparatus;
providing an application setting screen based on the application setting configuration file with the deleted unnecessary definition;
verifying whether or not a definition set via the application setting screen is applicable to the program based on the acquired application setting configuration file; and
distributing, if the verification indicates that the definition set via the application setting screen is applicable to the program, the definition set as the setting value via the application setting screen to the image forming apparatus,
wherein the application setting configuration file defines candidate definitions as a setting value applicable to the program, wherein the acquiring acquires the application setting configuration file defining a definition candidate as a setting value to set a time interval for the image forming apparatus to upload a log file and information on a free disc space of the image forming apparatus, and wherein the unnecessary definition is not be able to be set as the setting value for the image forming apparatus in the provided application setting screen.

8. The non-transitory computer-readable storage medium according to claim 7,
wherein the deleting deletes a definition candidate defining a short time interval from the application setting configuration file in a case where the free disc space of the image forming apparatus is smaller than a predetermined threshold value, and
wherein the definition candidate defining the short time interval is not able to be set as the setting value for the image forming apparatus in the application setting screen.

9. The non-transitory computer-readable storage medium according to claim 8, further comprising:
adding a definition candidate defining a long time interval in the application setting configuration file in a case where the free disc space of the image forming apparatus is equal to or greater than the predetermined threshold value
wherein the definition candidate defining the long time interval is able to be set as the setting value for the image forming apparatus in the application setting screen.

\* \* \* \* \*